United States Patent
Williams

(10) Patent No.: US 12,415,574 B2
(45) Date of Patent: Sep. 16, 2025

(54) MUD GUARD CONTROL SYSTEMS FOR VEHICLES AND METHODS OF CONTROLLING MUD GUARDS

(71) Applicant: Toyota Motor Engineering & Manufacturing North America, Inc., Plano, TX (US)

(72) Inventor: Paxton S. Williams, Milan, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 238 days.

(21) Appl. No.: 17/874,986

(22) Filed: Jul. 27, 2022

(65) Prior Publication Data

US 2024/0034415 A1 Feb. 1, 2024

(51) Int. Cl.
*B62D 25/18* (2006.01)

(52) U.S. Cl.
CPC .................. *B62D 25/182* (2013.01)

(58) Field of Classification Search
CPC .................................................. B62D 25/182
See application file for complete search history.

(56) References Cited

U.S. PATENT DOCUMENTS

| | | | |
|---|---|---|---|
| 8,066,304 B2 | 11/2011 | Ulgen | |
| 9,352,786 B1 * | 5/2016 | Martin | B62D 25/182 |
| 9,963,174 B1 * | 5/2018 | Cooper | B62D 25/188 |
| 9,969,436 B1 * | 5/2018 | Gause | B60R 16/023 |
| 10,093,361 B2 | 10/2018 | Wilson | |
| D877,674 S * | 3/2020 | Procuik | D12/184 |
| 10,683,041 B1 * | 6/2020 | Smith | B60P 1/283 |
| 2004/0164539 A1 * | 8/2004 | Bernard | B62D 25/182 280/848 |
| 2009/0273176 A1 * | 11/2009 | Ulgen | B62D 25/182 280/851 |
| 2012/0068448 A1 * | 3/2012 | Lasser | B62D 25/188 29/428 |
| 2013/0285358 A1 * | 10/2013 | Lasser | B62D 25/188 280/848 |
| 2018/0251161 A1 * | 9/2018 | Wilson | B62D 25/182 |
| 2020/0100329 A1 * | 3/2020 | Keshipeddy | H05B 1/0236 |
| 2021/0170967 A1 * | 6/2021 | Nishida | B62D 25/18 |

(Continued)

FOREIGN PATENT DOCUMENTS

| | | | |
|---|---|---|---|
| DE | 20110028918 A | * | 3/2011 |
| DE | 102019102641 B4 | | 9/2021 |
| EP | 3590794 B1 | | 2/2021 |

(Continued)

OTHER PUBLICATIONS

Machine translation for KR20110028918A, Kim Yong, Mar. 22, 2011.*
Machine translation for JP2006315566A, Oda Kazunori, Nov. 24, 2006.*

*Primary Examiner* — Abdalla A Khaled

(74) *Attorney, Agent, or Firm* — Dinsmore & Shohl LLP

(57) ABSTRACT

A vehicle includes a mud guard control system including a speed sensor configured to provide a signal indicative of speed to a controller. The controller is configured to instruct an actuator to move a mud guard from a stowed configuration to a deployed configuration based on the signal from the speed sensor when the speed of the vehicle is below a predetermined threshold value.

9 Claims, 2 Drawing Sheets

(56) References Cited

U.S. PATENT DOCUMENTS

2022/0227427 A1\* 7/2022 Ming ................... B62D 25/168

FOREIGN PATENT DOCUMENTS

| JP | 2006315566 | A | \* | 11/2006 |
| JP | 2008081095 | A |  | 4/2008 |
| KR | 20110028918 | A | \* | 3/2011 |
| KR | 1020110028918 | A |  | 3/2011 |

\* cited by examiner

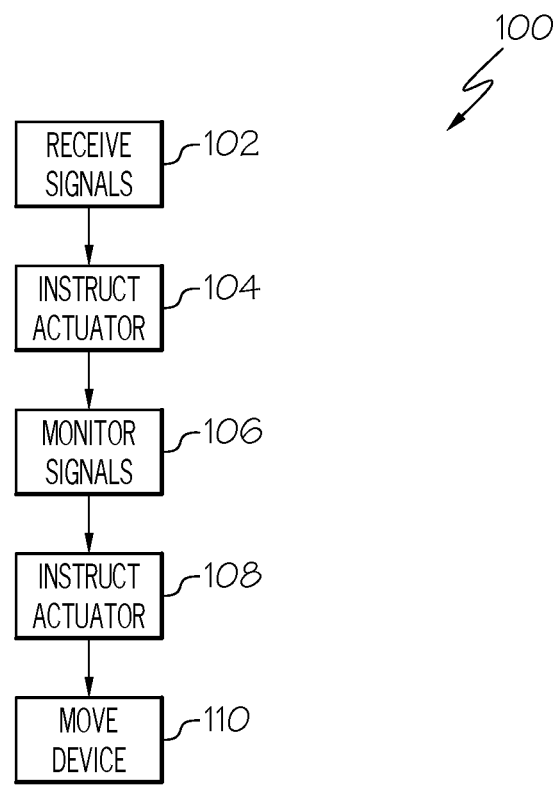

MUD GUARD CONTROL SYSTEMS FOR VEHICLES AND METHODS OF CONTROLLING MUD GUARDS

TECHNICAL FIELD

The present specification generally relates to mud guard control systems for vehicles and, in particular mud guard control systems that extend and retract mud guards for vehicles.

BACKGROUND

Mud guards are often flaps that are suspended behind the rear wheels of vehicles. Mud guards are commonly used as they can protect pedestrians, adjacent vehicles and the vehicles themselves from mud slung from the wheels. Because mud guards are typically flat, solid pieces of material that are suspended vertically, the mud guards can increase drag on the vehicles, which can reduce fuel efficiency. The fuel efficiency can be particularly affected by the presence of the mud guards when the vehicles reach higher speeds.

Accordingly, a need exists to provide mud guard control systems that control operation of mud guards.

SUMMARY

In one embodiment, a vehicle includes a mud guard control system including a speed sensor configured to provide a signal indicative of speed to a controller. The controller is configured to instruct an actuator to move a mud guard from a stowed configuration to a deployed configuration based on the signal from the speed sensor when the speed of the vehicle is below a predetermined threshold value.

In another embodiment, a method of controlling operation of a mud guard using a mud guard control system of a vehicle is provided. The method includes a controller receiving a signal indicative of speed of the vehicle from a speed sensor. If the speed of the vehicle is below a predetermined threshold value determined using the signal, the controller instructs an actuator to move the mud guard from a stowed configuration to a deployed configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 depicts a method of controlling a mud guard using a mud guard control system, according to one or more embodiments shown and described herein.

DETAILED DESCRIPTION

Embodiments described herein are generally related to vehicles that include mud guard control systems. The mud guard control systems include a controller that controls operation of an actuator so as to extend a mud guard when a vehicle is operating below a preselected speed and to retract the mud guard when the vehicle is operating above the preselected speed. The mud guard control systems may also control operation of a guard engagement device adjacent the mud guard that removes debris from the mud guard.

Figure 1:
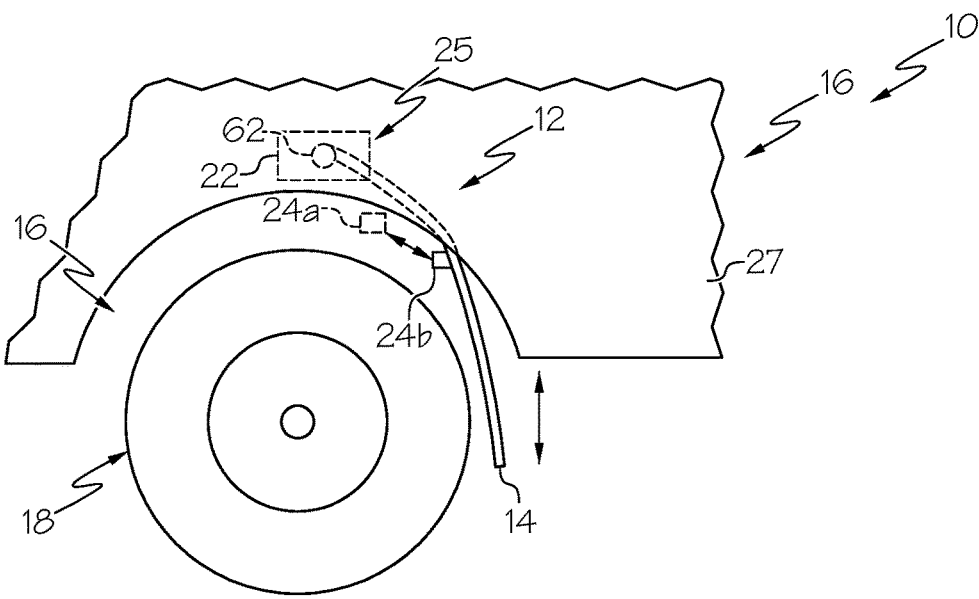
FIG. 1 depicts a vehicle including a mud guard control system for controlling operation of mud guards, according to one or more embodiments shown and described herein.

Referring to FIG. 1, a portion of a vehicle 10 is illustrated that includes a mud guard control system 12 for use in controlling mud guards 14 of the vehicle 10. While a bed portion 16 of a truck is shown, it is noted that the present disclosure may be applied to any vehicle, such as semi-trailer trucks, all-terrain vehicles, utility task vehicles and cars. It is contemplated that the vehicle may or may not be an autonomous vehicle or a partially autonomous vehicle. The vehicle may be fully drivable.

The vehicle 10 includes a plurality of wheel wells including rear wheel wells 16. The wheel wells 16 are locations where wheels 18 of the vehicle 10 are located. The mud guard control system 12 includes the mud guard 14, an actuator 22 that is operatively connected to the mud guard 14 for raising and extending the mud guard 14 and a guard engagement device 24 (e.g., a bar or squeegee) that can be placed in engagement with the mud guard 14 for removing mud and debris from the mud guard 14. In some embodiments, the actuator 22 may move the guard engagement device 24 between a retracted position 24a and an engaged position 24b in engagement with the mud guard 14. When the mud guard 14 is raised using the actuator 22, the mud guard 14 can scrape against the guard engagement device 24, which removes some of the mud and debris from the mud guard 14. The mud guard 14 can also be raised into a housing 25 that is located within a body 27 of the vehicle 10.

Figure 2:
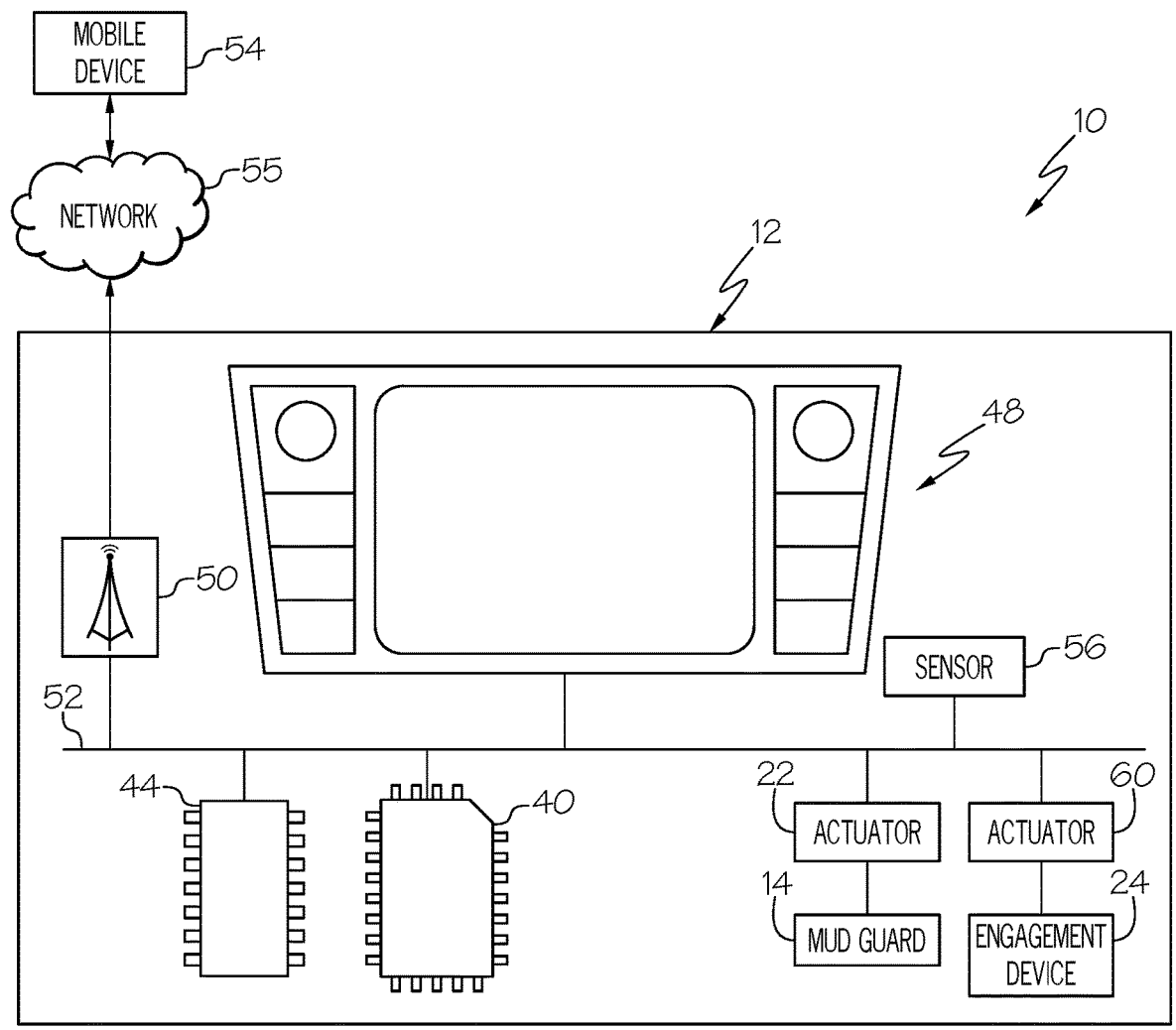
FIG. 2 depicts the mud guard control system of FIG. 1, according to one or more embodiments shown and described herein.

Referring to FIG. 2, the vehicle 10 includes the mud guard control system 12 that includes one or more processors 40. Each one or more processor 40 may be any device capable of executing machine readable instructions. Accordingly, each one or more processor 40 may be a controller, an integrated circuit, a microchip, a computer, or any other computing device, collectively referred to as controllers. The controllers 40 are coupled to a communication path 52 that provides signal interconnectivity between various modules. Accordingly, the communication path 52 may communicatively couple any number of controllers 40 with one another, and allow the modules coupled to the communication path 52 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 52 may be formed from any medium that is capable of transmitting a signal such as, for example, conductive wires, conductive traces, optical waveguides, or the like. In some embodiments, the communication path 52 may facilitate the transmission of wireless signals, such as WiFi, Bluetooth, and the like. Moreover, the communication path 52 may be formed from a combination of mediums capable of transmitting signals. In one embodiment, the communication path 52 comprises a combination of conductive traces, conductive wires, connectors, and buses that cooperate to permit the transmission of electrical data signals to components such as processors, memories, sensors, input devices, output devices, and communication devices. Accordingly, the communication path 52 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle 10 further includes one or more memory modules 44 coupled to the communication path 52. The one or more memory modules 44 may comprise RAM, ROM, flash memories, hard drives, or any device capable of storing machine readable instructions such that the machine readable instructions can be accessed by the one or more processors 40. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 44. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

The vehicle 10 comprises a display 48 for providing visual output such as, for example, maps, navigation, entertainment, information, or a combination thereof. The display 48 is coupled to the communication path 52, as shown in FIG. 2. Accordingly, the communication path 52 communicatively couples the display 48 to other modules of the vehicle 10. The display 48 may include any medium capable of transmitting an optical output such as, for example, a cathode ray tube, light emitting diodes, a liquid crystal display, a plasma display, or the like. Moreover, the display 48 may be a touch screen that, in addition to providing optical information, detects the presence and location of a tactile input upon a surface of or adjacent to the display 48. Accordingly, the display 48 may receive mechanical input directly upon the optical output provided by the display 48. The display 48 can be used to control operation of the mud guard control system 12. It is noted that the display 48 can include at least one of the one or more processors 40 and the one or memory modules 44. The display 48 can be at least one of a heads-up display, an instrument cluster display, and a mobile device display. In some embodiments, the vehicle 10 may have a plurality of displays. In such embodiments, the vehicle 10 can also have a plurality of different types of displays at various locations within the vehicle 10. For example, and not as a limitation, the vehicle 10 can have an in-dashboard display and a heads-up display for displaying information directly on a windshield or window of the vehicle 10.

In some embodiments, the vehicle 10 comprises network interface module 50 for communicatively coupling the vehicle 10 to a network 55. The network interface module 50 can be communicatively coupled to the communication path 52 and can be any device 54 capable of transmitting and/or receiving data via the network. Accordingly, the network interface module 50 can include a communication transceiver for sending and/or receiving any wired or wireless communication. For example, the network interface module 50 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface module 50 includes hardware configured to operate in accordance with the Bluetooth wireless communication protocol. In another embodiment, network interface module 50 may include a Bluetooth send/receive module for sending and receiving Bluetooth communications to/from a mobile device 54 (e.g., a smartphone including a virtual key) for controlling operation of the mud guard control system 12.

The vehicle 10 may include one or more sensors, generally referenced as element 56, communicatively coupled to the one or more processors 40. The one or more sensors 56 may include, but are not limited to, speed sensors, cameras, LiDAR, RADAR, proximity sensors, pressure sensors, etc. In some embodiments, multiple types of sensors are used to provide a variety of information to the vehicle 10, such as vehicle speed.

One or more actuators 22 and 60 are communicatively coupled to the communication path 52 so as to be controlled by the controller 40. The actuator 22 may be operatively connected to the mud guard 14 for raising and lowering the mud guard 14 and the actuator 60 may be operatively connected to the guard engagement device 24 for moving the guard engagement device 24 into and out of engagement with the mud guard 14. Any suitable actuators 22 and 60 can be used, such as motors, pneumatic and/or hydraulic cylinders, etc. For example, the actuator 22 may include a take up wheel 62 (FIG. 1) that can be used to roll up the mud guard 14 when not in use.

Referring to FIG. 3, a method 100 of controlling operation of the mud guard 14 using the mud guard control system 12 is illustrated. At step 102, the controller 40 receives signals indicative of speed of the vehicle from the speed sensor 56. If the speed of the vehicle is below a predetermined threshold value (e.g., 35 mph or less, such as 30 mph or less, such as 25 mph or less, such as 20 mph or less, such as 15 mph or less, such as 10 mph or less), the controller 40 instructs the actuator 22 to lower the mud guard 14 to the deployed configuration automatically using logic saved in the memory 44 at step 104. At step 106, the controller 40 continues to monitor the signals from the speed sensor 56. If the speed of the vehicle is above the predetermined threshold value, the controller instructs the actuator 22 to raise the mud guard 14 to the stowed configuration at step 108. As or before the mud guard 14 is raised, the actuator 60 may move the guard engagement device 24 into engagement with the mud guard 14 at step 110. Movement of the mud guard 14 against the guard engagement device 24 may cause mud and debris on the mud guard 14 to scrape against the guard engagement device 24 thereby removing mud and debris therefrom.

The above-described mud guard control systems can be used to automatically extend and retract mud guards between deployed and stowed configurations. The mud guards can be deployed and retracted automatically based on vehicle speed, which can allow the mud guard to be deployed at relatively low vehicle speeds and retracted at relatively high vehicle speeds. This control arrangement can reduce the effect on drag that the mud guard has at the relatively higher vehicle speeds. The mud guard has less influence on coefficient of drag at lower vehicle speeds when it is in the deployed configuration.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a mud guard control system comprising a speed sensor configured to provide a signal indicative of speed of the vehicle to a controller;
   wherein the controller is configured to instruct an actuator to move a mud guard from a stowed configuration to a deployed configuration based on the signal from the speed sensor when the signal provided by the sensor indicates to the controller that the speed of the vehicle is below a predetermined threshold value; and
   a guard engagement device that is configured to remove mud from the mud guard when the mud guard is moved from the deployed configuration to the stowed configuration, the guard engagement device configured to move from a retracted position removed from the mud guard to an engaged position in engagement with a tire facing side of the mud guard based on instructions from the controller.

2. The vehicle of claim 1 further comprising another actuator configured to move the guard engagement device from the retracted position removed from the mud guard to the engaged position in engagement with the mud guard.

3. The vehicle of claim 1 further comprising a housing in a body of the vehicle configured to receive the mud guard in the stowed configuration.

4. The vehicle of claim 1, wherein the controller is configured to instruct the actuator to move the mud guard from the deployed configuration to the stowed configuration based on the signal from the speed sensor when the speed of the vehicle is above the predetermined threshold value.

5. A method of controlling operation of a mud guard using a mud guard control system of a vehicle, the method comprising:
   a controller receiving a signal indicative of speed of the vehicle from a speed sensor;
   when the speed of the vehicle is below a predetermined threshold value determined by the controller using the signal from the speed sensor, the controller instructing an actuator to move the mud guard from a stowed configuration to a deployed configuration;
   moving a guard engagement device from a retracted position removed from the mud guard to an engaged position in engagement with a tire facing side of the mud guard based on instructions from the controller; and
   removing mud from the mud guard using the guard engagement device when the mud guard is moved from the deployed configuration to the stowed configuration.

6. The method of claim 5 further comprising another actuator moving the guard engagement device from the retracted position removed from the mud guard to the engaged position in engagement with the mud guard.

7. The method of claim 5 further comprising a housing in a body of the vehicle configured to receive the mud guard in the stowed configuration.

8. The method of claim 5, wherein the controller instructing the actuator to move the mud guard from the deployed configuration to the stowed configuration based on the signal from the speed sensor when the speed of the vehicle is above the predetermined threshold value.

9. The method of claim 8, wherein the mud guard is moved into a body of the vehicle in the stowed configuration.

* * * * *